United States Patent [19]

Kondo

[11] 4,196,458

[45] Apr. 1, 1980

[54] PHOTOGRAPHIC FLASHLIGHT APPARATUS

[75] Inventor: Isao Kondo, Hachioji, Japan

[73] Assignee: Olympus Optical Co., Ltd., Tokyo, Japan

[21] Appl. No.: 925,114

[22] Filed: Jul. 17, 1978

[30] Foreign Application Priority Data

Nov. 29, 1977 [JP] Japan .......................... 52-160818[U]

[51] Int. Cl.[2] .............................................. G03B 15/02

[52] U.S. Cl. ...................................... 362/10; 362/265; 362/394

[58] Field of Search .......................... 362/10, 265, 394

[56] References Cited

U.S. PATENT DOCUMENTS 3,745,896 7/1973 Sperti ................................ 362/10 X

*Primary Examiner*—Stephen J. Lechert, Jr.

*Attorney, Agent, or Firm*—Lerner, David, Littenberg & Samuel

[57] ABSTRACT

A flashlight apparatus includes a power switch, formed by a changeover switch, which is connected in a path to discharge a primary discharge capacitor and a trigger capacitor in its off condition to disable a flashlight operation. Simultaneously, a neon tube light which indicates the completion of charging of the primary discharge capacitor is turned off, indicating the off position of the power switch.

4 Claims, 2 Drawing Figures

PHOTOGRAPHIC FLASHLIGHT APPARATUS

BACKGROUND OF THE INVENTION

The invention relates to a photographic flashlight apparatus, and more particularly to such apparatus including a flash discharge tube, primary discharge capacitor, trigger capacitor and a light which indicates the completion of charging of the primary discharge capacitor.

As is well recognized, a photographic flashlight apparatus is usually constructed such that a primary discharge capacitor and trigger capacitor are previously charged from a power source, and a trigger circuit is activated by a synchro contact which is closed upon opening a shutter of a photographic camera, thus allowing the charge on the primary capacitor to be rapidly supplied to a flash discharge tube in order to produce flashlight illumination therefrom which is synchronized with the opening of the shutter of the camera. A lamp such as neon tube lamp included in a charging complete indicator circuit also indicates whether the primary discharge capacitor is sufficiently charged to enable a given amount of illumination.

In use, when such apparatus is mounted on a camera and an arrangement is made to make it ready to provide a flashlight illumination for taking a picture, an inconvenience may be experienced if the intended flashlight photographing operation is abandoned by turning off the apparatus and a picture is then taken under ordinary daylight illumination. Specifically, when the apparatus is ready to initiate a flashlight operation, both the primary and trigger capacitors are completely charged to their given values, and thus are maintained in a condition capable of enabling flashlight illumination for a certain period of time if the power source is subsequently turned off. As a consequence, if a shutter button of the camera is depressed at a short interval after the flashlight apparatus has been turned off, the apparatus may be activated to produce synchronized illumination inadvertently, thus causing an overexposure.

Several approaches have been proposed to eliminate such difficulty. In one arrangement, a switch may be provided which is separate from but is ganged with the power switch and which disables both the trigger circuit and the charging complete indicator circuit or the trigger circuit alone when the power switch is turned off. However, this requires the use of two a pole switch or ganged switches wich connect or disconnect two electrical paths, which result in an increase in the cost. In addition if a switch portion associated with one path fails to operate properly, a malfunctioning will result. Thus the arrangement cannot be a satisfactory solution.

It is to be noted however that a flashlight apparatus includes a charging complete indicator circuit as mentioned above which indicates the completion of the charging of the primary capacitor as by the lit condition of a neon tube lamp, for example. Hence, it will be convenient if such lamp can be utilized to indicate the on or off position of the power switch.

SUMMARY OF THE INVENTION

It is an object of the invention to provide a photographic flashlight apparatus which is disabled immediately upon turning off the power switch and in which a charging complete to indicate lamp serves indicating the on or off position of the power switch.

In accordance with the invention, the described disadvantage can be completely eliminated by merely adding to a conventional flashlight circuit a simple arrangement in which the off terminal of a power switch, formed by a changeover switch, is connected with the junction between a charging complete indicator circuit and a trigger circuit to couple them together without interfering with their individual functions. Since the switch represents a single path changeover switch, no substantial increase in the cost is involved. The addition of the switch does not produce any sneak path around other circuits, allowing the power switch to be turned on and off without causing adverse influences. Since the charging complete indicator tube indicates the on or off position of the power switch, it provides a warning against the user whenever the power switch is left in its on position.

DESCRIPTION OF PREFERRED EMBODIMENTS

Figure 1:
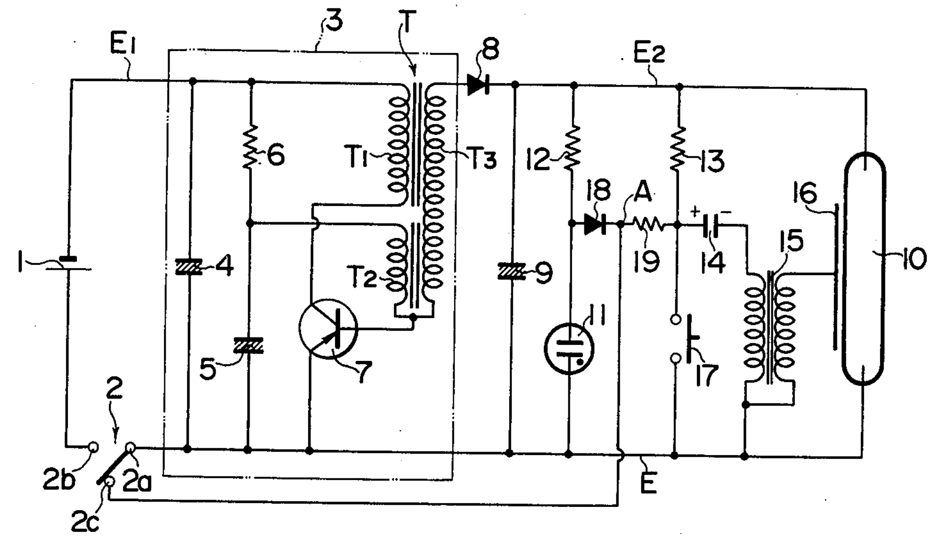
FIG. 1 is a circuit diagram of the electrical circuit of the photographic flashlight apparatus of the invention.

Referring to FIG. 1, ther is shown a power source 1 in the form of a dry cell, which is connected through a power switch 2, formed by a single pole, double throw switch, with a booster circuit 3 which comprises a DC—DC transistor converter.

The negative terminal of the source 1 is connected with a bus $E_1$ while the positive terminal is connected with an on contact *2b* of the power switch 2, which also includes a movable contact *2a* connected with a bus E representing the ground. In this manner, the source 1 is connected in or disconnected from the circuit by closing or opening the connection with the ground through the power switch 2. The booster 3 includes capacitor 4 which minimizes voltage fluctuation and which is connected in shunt with a series combination of capacitor 5 providing a stabilized oscillation and a base biasing resistor 6. The booster also includes an oscillator transistor 7 and a converter transformer T. Transformer T includes a primary wind $T_1$ which is connected across the bus $E_1$ and the collector of transistor 7, and a feedback winding $T_2$ which has its one end connected with the base of transistor 7 and its other end connected to the junction between capacitor 5 and resistor 6, thus forming an oscillator circuit together with transistor 7. Transformer T also includes a secondary winding $T_3$ which has its one end connected with the base of transistor 7. A booster output is derived from the other end of the secondary winding and is supplied through diode 8 to a positive bus $E_2$. It will be noted that the emitter of transistor 7 is connected with the ground line E.

A primary discharge capacitor 9, a charging complete indicator circuit, a trigger circuit and a flash discharge tube 10 are connected in shunt across the busses $E_2$ and E.

The charging complete indicator circuit comprises a series circuit of an indicator lamp 11 such as neon tube lamp and resistor 12, and the lamp 11 is illuminated when the terminal voltage across the primary capacitor 9 is sufficient to cause a flashlight illumination of a sufficient amount from the discharge tube 10. The trigger circuit comprises a series circuit including resistor 13, trigger capacitor 14 and trigger transformer 15. The secondary winding of trigger transformer 15 has its one end connected with a trigger electrode 16 of the discharge tube 10. A synchro contact 17 of the camera is connected across the junction between resistor 13 and capacitor 14 and the ground line E. As is well recognized, the contact 17 is closed at the time the shutter of the camera is opened. It is also closed when a test button (not shown) is depressed for testing the illumination of the flashlight apparatus.

In the present embodiment, the charging complete indicator circuit and the trigger circuit are coupled together at point A which is connected with the off contact 2c of the power switch 2. Specifically, the junction between resistor 12 and lamp 11 of the indicator circuit is coupled with the junction between resistor 13 and capacitor 14 of the trigger circuit through a series circuit including diode 18 and resistor 19, and the junction A between diode 18 and resistor 19 is connected with the off contact 2c. Diode 18 has its anode connected with the junction between resistor 12 and lamp 11 and its cathode connected with resistor 19, thus preventing an interference between both circuits.

In operation, when the power switch 2 is turned on, namely, its movable contact is thrown to on contact 2b in preparation for a flashlight operation, both capacitors 9 and 14 are charged through the booster 3. When the primary capacitor 9 is charged to a given voltage, neon tube light 11 is illuminated to indicate the completion of charging or the fact that the apparatus is ready to initiate a flash-light operation. Subsequently, when the synchro contact 17 or a trigger switch is closed, the charge on the trigger capacitor 14 discharges through the primary winding of trigger transformer 15, thus causing its secondary winding to apply a high voltage trigger pulse to trigger electrode 16 to trigger the discharge tube 10, whereupon the charge on the primary capacitor 9 rapidly discharges through the discharge tube 10, thus producing a flashlight illumination.

However, when the power switch 2 is turned off, namely, its movable contact is thrown to off contact 2c after the apparatus is made ready to initiate a flashlight operation, the junction between diode 18 and resistor 19 is connected through switch 2 to the ground line E, thus completing a closed loop through capacitor 14, resistor 19, off contact 2c, movable contact 2a, ground line E and the primary winding of transformer 15 to allow the charge on the trigger capacitor 14 to be discharged. The resistance of resistor 19 is chosen to prevent the discharge tube 10 from being triggered during such discharge. Specifically, resistor 19 may have a resistance of 10 kiloohms usually when the trigger capacitor 14 has a capacitance of 0.02 to 0.1 $\mu$F. The time constant will be $0.02 \sim 0.1\ \mu F \times 10$ kiloohms $= 0.2$ ms $\sim 1$ ms. If resistor 19 has a resistance of 10 kiloohms, the time constant will be from 2 to 10 ms. In either instance, the discharge is completed substantially momentarily without producing any effective trigger signal.

When the switch 2 is turned off, the lamp 11 is effectively short-circuited by diode 18 which is forwardly biased, whereby it is extinguished. Thus an indication is provided that the power switch has been turned off. The primary capacitor 9 discharges through resistor 12, diode 18 and switch 2, thus completely disabling the discharge illumination circuit. As a consequence, the apparatus cannot produce a flashlight illumination if the synchro contact 17 is closed by a subsequent photographing operation while the power switch is turned off, thus avoiding the described disadvantage of the prior art.

Figure 2:
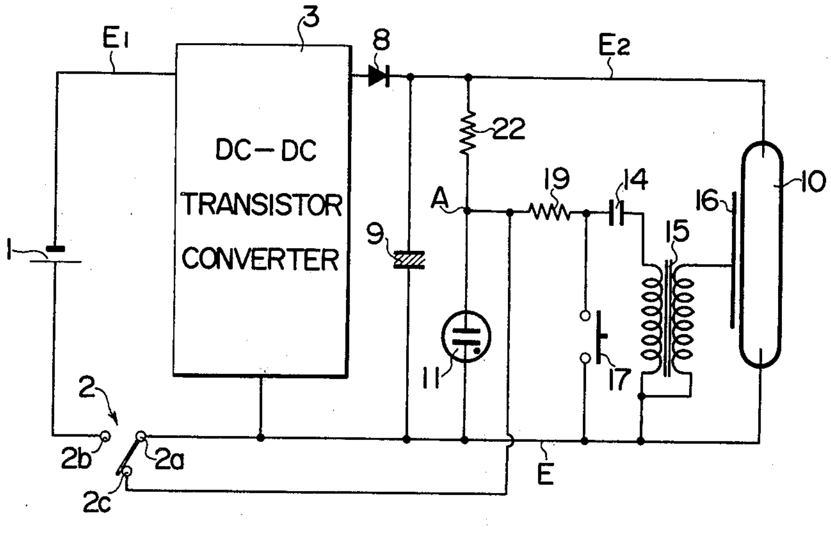
FIG. 2 is a circuit diagram of another embodiment of the invention.

FIG. 2 shows another embodiment of the invention in which both the charging complete indicator circuit and the trigger circuit are fed through a single resistor 22 and in which the use of the diode 18 is avoided, the junction between resistor 22, lamp 11 and resistor 19 being connected with the off contact 2c of the power switch 2. Because of the constant voltage characteristic of the neon tube lamp 11, the terminal voltage of the trigger capacitor 14 cannot rise above that of the lamp 11. In most applications, this is sufficient to drive the trigger circuit, allowing a reduction in the number of part as compared with the circuit of FIG. 1. In other respects, the circuit of FIG. 2 operates in a manner similar to that of the circuit shown in FIG. 1.

What is claimed is:

1. In a photographic flashlight apparatus including a flash discharge tube, a primary capacitor connected across the flash discharge tube, a charging complete indicator circuit includng a lamp for indicating the completion of charging of the primary capacitor, and a trigger circuit including a trigger capacitor associated with the discharge tube; the improvement which comprises a power switch in the form of a single pole, double throw switch which connects a power source with or disconnects it from ground, and means connecting an off contact of the power switch with a junction between the charging complete indicator circuit and the trigger circuit, said means short-circuiting the lamp in the indicator circuit and the trigger capacitor when the power switch is turned off.

2. The apparatus according to claim 1 in which the single pole, double throw switch includes a movable contact which is connected with the ground and an on contact which is connected with the positive terminal of the power source.

3. The apparatus according to claim 1 in which said short-circuiting means comprises a first series circuit including a diode and a resistor, and wherein the charging complete indicator circuit includes a resistor in series with the lamp and the trigger circuit comprises a series combination of a resistor, the trigger capacitor and a trigger transformer, said first series circuit being connected between the junction between the resistor and the lamp of the indicator circuit and the junction between the resistor and the capacitor of the trigger circuit, the junction between the diode and the resistor of said first series circuit being connected with the off contact of the power switch.

4. The apparatus according to claim 1 in which the charging complete indicator circuit includes a resistor in series with the lamp, and the trigger circuit comprises another resistor, the trigger capacitor and a trigger transformer connected in series, said short-circuiting means coupling the junction between the resistor and the lamp of the indicator circuit with said another resistor of the trigger circuit and also with the off contact of the power switch.

* * * * *

UNITED STATES PATENT AND TRADEMARK OFFICE

CERTIFICATE OF CORRECTION

PATENT NO. : 4,196,458

DATED : April 1, 1980

INVENTOR(S) : Isao Kondo

It is certified that error appears in the above—identified patent and that said Letters Patent is hereby corrected as shown below:

Column 1, line 49, change "two a" to --a two--.

Column 1, line 50, change "wich" to --which--.

Column 1, line 67, change "indicating" to --to indicate--.

Column 2, line 28, change "ther" to --there--.

Signed and Sealed this

*Seventh* Day of *April 1981*

[SEAL]

*Attest:*

RENE D. TEGTMEYER

*Attesting Officer* *Acting Commissioner of Patents and Trademarks*